United States Patent [19]

Becker et al.

[11] Patent Number: 4,457,334
[45] Date of Patent: Jul. 3, 1984

[54] PRESSURE SENSITIVE VALVE ACTUATOR

[75] Inventors: Henry Becker, Sterling; Rodney Hubbard, Fredericksburg; Roger Gibbs, Dahlgren; Roger Engels, Fredericksburg, all of Va.

[73] Assignee: The United States of America as represented by the Secretary of the Navy, Washington, D.C.

[21] Appl. No.: 423,335

[22] Filed: Sep. 24, 1982

[51] Int. Cl.³ .............................................. F16K 17/00
[52] U.S. Cl. .................................... 137/461; 137/463; 251/73
[58] Field of Search ................... 137/461, 463; 251/73

[56] References Cited
U.S. PATENT DOCUMENTS

| | | | |
|---|---|---|---|
| 2,718,899 | 9/1955 | Goddard | 137/463 |
| 2,785,698 | 3/1957 | Vance | 137/461 |
| 3,228,417 | 1/1966 | Schwerter | 137/461 |
| 3,709,242 | 1/1973 | Chase | 137/461 |
| 4,276,237 | 6/1981 | Barker | 137/81.1 X |

Primary Examiner—Harold W. Weakley
Attorney, Agent, or Firm—Robert F. Beers; Kenneth E. Walden; Donald J. Breh

[57] ABSTRACT

A pressure sensitive device for shutting off flow through a valve is disclosed. The device includes a pressure sensor having an integral atmospheric pressure reference for releasing a plunger to shut off flow through the valve. A manually operated eccentric pin and slot arrangement is provided for resetting the plunger to the open position.

1 Claim, 7 Drawing Figures

VALVE CLOSED

INTERMEDIATE

VALVE OPEN

PRESSURE SENSITIVE VALVE ACTUATOR

BACKGROUND OF THE INVENTION

The present invention relates to the field of valve shut off devices. More particularly the invention relates to a device for shutting off the fluid flow through a valve when excess pressure is sensed within the valve.

Although not limited thereto, it is contemplated that the present invention is to be used in air sampling systems of the type that monitor air from a closed compartment. Typically, when the air to be monitored contains harmful components, such as radiation or chemical compounds, it is drawn into a sealed container through a conduit from the generating location, measured for the particular constituents while in the container, and returned to the operating environment via another conduit. This type of monitoring system is a closed system and if excess pressure is allowed to build up within the system there can be catastrophic consequences on the sampling container and personnel. If the pressure becomes high enough, the container may leak or burst releasing the hazardous matter into the environment exposing personnel thereto.

Devices have been made for insertion into the conduits leading to and from the container for shutting off flow but each have limitations. Heretofore, flow has been shut off by utilizing electric solenoid operated valves in conjunction with separate pressure sensors in the system. These devices require electrical power and associated controls which make them more complicated.

Other devices for sensing pressure within the system, and for operating a shut off, include those that have a diaphragm for sensing differential pressure between the atmosphere and the system. While these devices do function to shut off flow when high pressure is sensed, they require that one side of the diaphram be vented directly to the surrounding atmosphere to establish a pressure reference. In the event of diaphram failure, the contaminants will be released directly into the atmosphere exposing personnel thereto.

OBJECTS OF THE INVENTION

1. It is an object of the invention to provide for a shut off device that is capable of shutting off flow when excess pressure is sensed within a system.

2. It is another object of the invention to provide a shut off device that requires no external venting to the atmosphere.

3. Another object of the invention is to provide for a shut off device that can be easily reset to permit flow to reoccur.

SUMMARY OF THE INVENTION

The objects are achieved and the limitations of the prior art are overcome by providing for a fluid flow shut off device having an internal pressure sensor that monitors the system pressure and includes an integral atmospheric pressure reference, thereby eliminating all external pressure references. The sensor also includes means for releasing a plunger at a preset pressure which moves to close the valve and block flow therethrough. The plunger is reset to the open position through an eccentric pin and a slot arrangement in which the pin engages an offset slot in the plunger, causing the plunger to move as the pin is pivoted.

DETAILED DESCRIPTION OF THE PREFERRED EMBODIMENT

Figure 5:
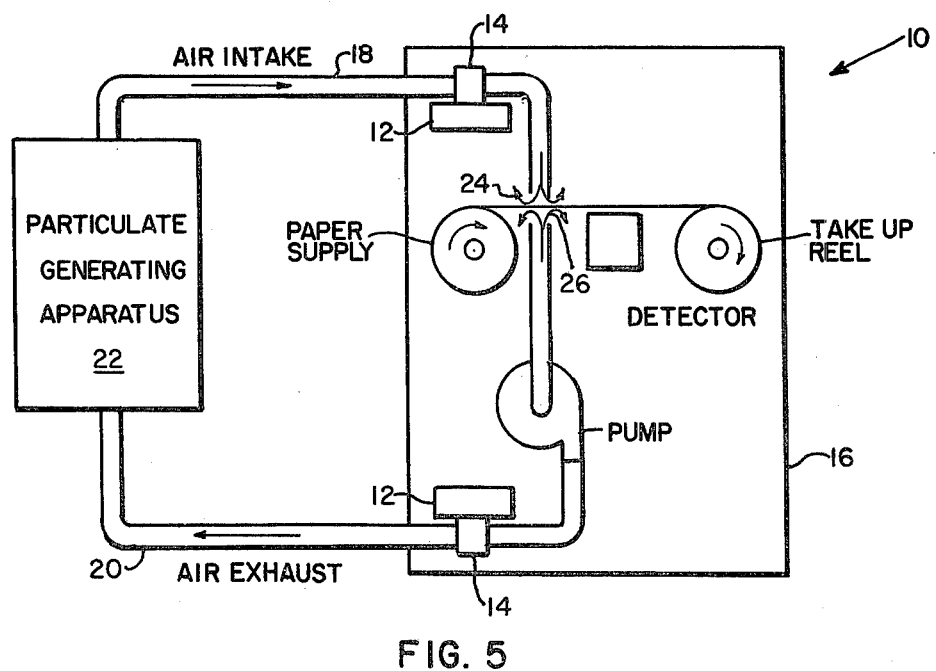
FIG. 5 is a schematic diagram of a typical system in which the invention is used.

FIG. 5 shows a typical air monitoring system 10 in which shut off device 12 is contemplated to be used. Shut off device 12 closes a valve 14 on the inlet and outlet to sampling container 16 whenever the pressure in conduits 18 and 20 exceed a preset value. The pressure rise in conduits 18 and 20 is normally caused by a malfunctioning apparatus 22 being monitored. The pressure rise in container 16 is caused by the inability of the flow into the container, shown as 24 in FIG. 5, through conduit 18, to escape, and the back flow into the container, shown as 26 in FIG. 5, through conduit 20, due to the malfunction in apparatus 22.

Figure 1:
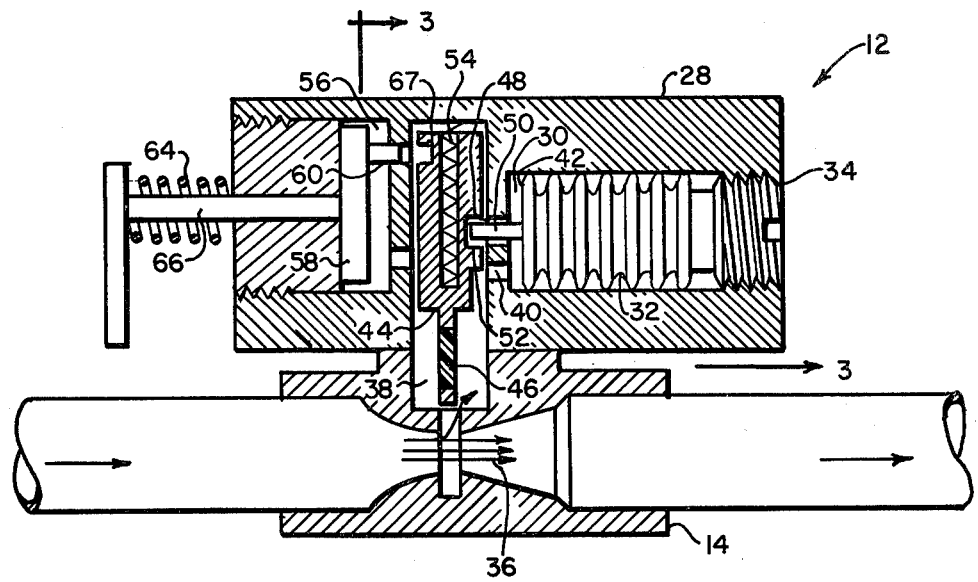
FIG. 1 is a vertical longitudinal cross sectional view showing details of the preferred embodiment in the open position.
Figure 2:
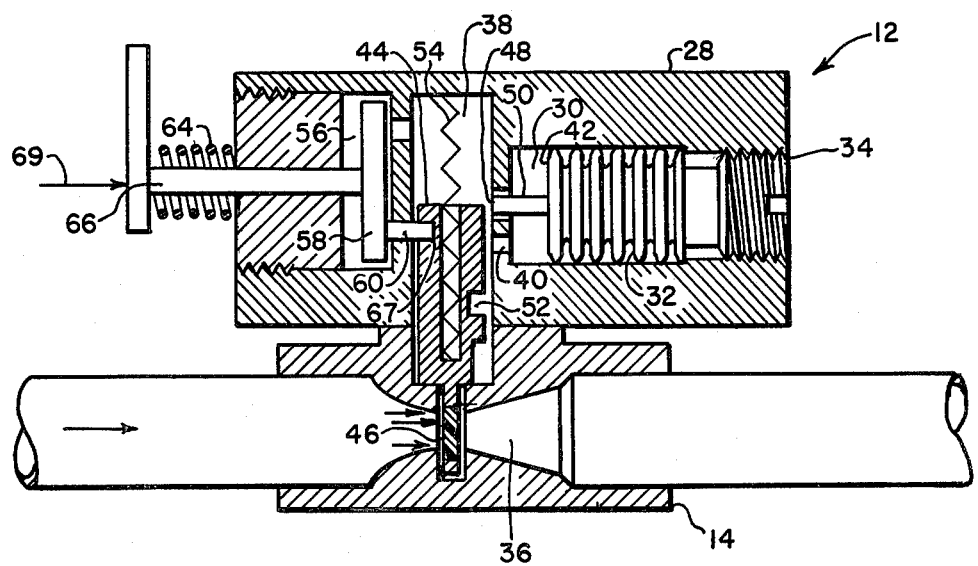
FIG. 2 is a vertical longitudinal cross sectional view showing details of the preferred embodiment in the closed position.

FIGS. 1 and 2 show shut off device 12 in a first position, hereinafter referred to as an open position for allowing fluid flow to pass through valve body 14, and in a second position, hereinafter referred to as a closed position for blocking fluid flow from either direction through the valve body respectively. Device 12 includes a housing 28 having three chambers. First chamber 30 has a pressure sensing device 32 mounted therein for sensing pressure on either side of the valve body. Pressure sensing device 32 is of a type that includes an integral atmospheric pressure reference means, thereby eliminating any need to have the pressure sensor referenced by a vent to the atmosphere. In the preferred embodiment shown in FIG. 1 pressure sensor 32 is a closed and sealed bellows container adjustably restrained at one end by adjustment screw 34 having its internal volume at atmospheric pressure. First chamber 30 is connected to valve throat 36 through a second chamber 38 and a passage 40. The pressure on free end 42 of bellows 32 is therefore continually maintained at the pressure of the flow within the valve and compresses the bellows in response to that pressure. The amount of compression of bellows 32 for a given pressure on end 42 depends on the bellows material, the number of pleats and the surface area of end 42.

Second chamber 38 has a plunger 44 slidably contained therein and includes a seal 46 on its lower end which extends into the valve for blocking the flow as shown in FIG. 2. Second chamber 38 is connected to first chamber 30 by an aperture 48. A pin 50 secured to free end 42 of bellows 32 extends through aperture 48 and engages a slot 52 in plunger 44. As shown FIG. 1, it can be seen that plunger 44 is held in the open position by pin 50. Pin 50 is held in slot 52 by the bias force exerted by the bellows. The pressure on bellows 32 required to cause pin 50 to retract out of slot 52 and release the plunger is predetermined by turning adjustment screw 34. Advancing screw 34 into the chamber will increase the required pressure. Plunger 44 is biased toward the closed position, shown in FIG. 2, by spring 54.

Figure 3:
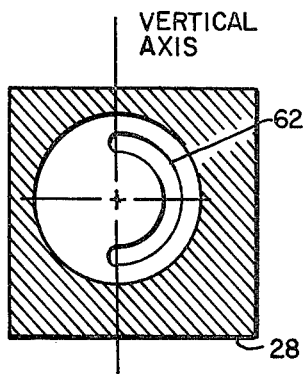
FIG. 3 is a vertical transverse cross sectional view along 3—3 in FIG. 1 showing details of the arcuate slot.

Referring to FIGS. 1 and 2, housing 28 has a third chamber 56 within which is slidably and pivotably mounted a disc 58 having a pin 60 located thereon which extends into an arcuate shaped slot 62, best shown in FIG. 3, that connects the second and third chambers. Pin 60 is located on disc 58 at a point falling on a circle having a radius that coincides with the radius of the arcuate slot. The centers of the disc and the arcuate slot coincide with the longitudinal axis of the third chamber, therefore pin 60 travels over the length of the slot as disc 58 is pivoted. Disc 58 is extended outside of the third chamber by shaft 66 and is biased toward a retacted position by a spring 64.

Figure 4A:
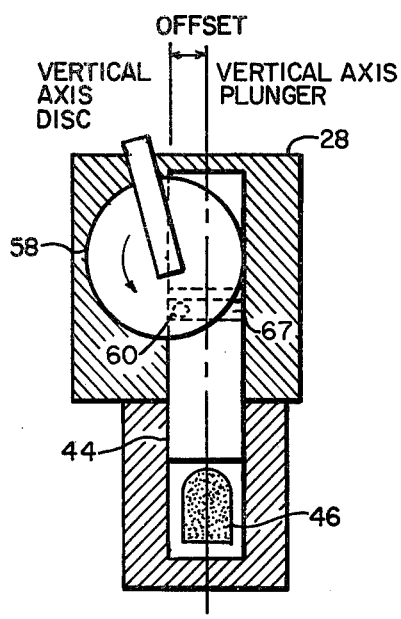
FIG. 4A is an end view in partial cross sectional form showing details of the reset arrangement when the plunger is in the closed position.
Figure 4B:
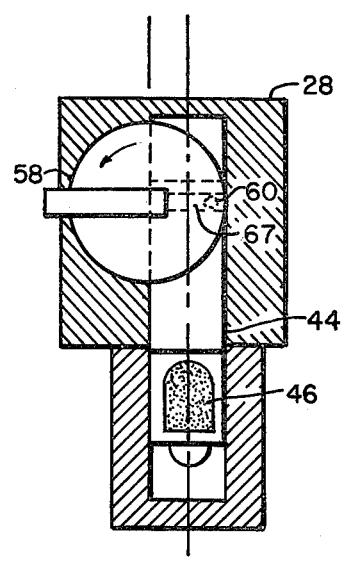
FIG. 4B is an end view in partial cross sectional form showing details of the reset arrangement with the valve moved to an intermediate position.
Figure 4C:
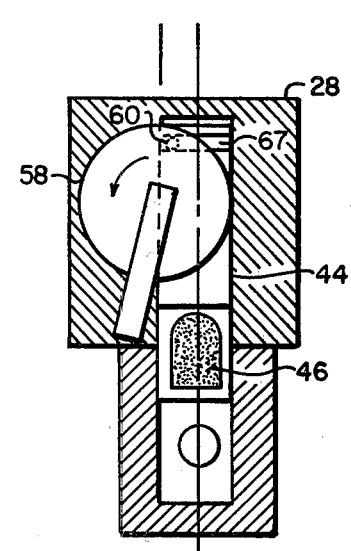
FIG. 4C is an end view in partial cross sectional form showing details of the reset arrangement with the plunger moved to the valve open position.

As shown in FIG. 2, pin 60 is caused to engage a second slot 67 in plunger 44 by pushing the disc in against the spring force, as shown by arrow 69 in FIG. 2, and pivoting the disc until the pin aligns with the slot. As shown in FIGS. 4A, 4B, 4C, the vertical axis of third chamber 56 and disc 58 is offset from the vertical axis of the second chamber forming an eccentric movement between the disc/pin and plunger.

The operation of the reset arrangment is better understood by referring to FIGS. 4A, 4B and 4C wherein a sequential chain of events is shown beginning with the plunger in the closed position, shown in FIG. 4A.

When it is desired to reset the plunger to the open position, FIG. 1, from the closed position, FIG. 2, disc 58 is caused to slide linearly in third chamber 56 until pin 60 contacts plunger 44. The disc is pivoted until pin 60 aligns with and engages second slot 67. With the disc held to keep pin 60 engaged in second slot 67, it is pivoted in the direction of the arrow in FIG. 4A causing the pin to begin traversing simultaneously arcuate slot 66 and linear second slot 67. The combined pivotal and linear movement of pin 60 causes plunger 44 to rise.

FIG. 4B shows plunger 44 lifted to an intermediate location and pin 60 having traversed the length of second slot 67. In this position the valve is partially open.

As shown in FIG. 4C, disc 68 is further pivoted to the limit of the arcuate slot and pin 60 reverses its path of travel over second slot 67. Plunger 44 therefor continues rising upward in second chamber 38.

When plunger first slot 52, see FIG. 1, aligns with pin 50 on the bellows, the pin will engage the slot and hold the plunger in place against the bias force of spring 54. Disc 58 is allowed to retract and disengage pin 60 from plunger second slot 67, as shown in FIG. 1. With the plunger reset to the open position flow may again pass through the valve.

What is claimed is:

1. A pressure responsive deivce for shutting off fluid flow through a valve body comprising:
   a housing having a first chamber in pressure communication with the flow through the valve body so as to be continously maintained at the same pressure as the flow, and having a second chamber connected to the first chamber by an aperture;
   a plunger slidably disposed within the second chamber adapted to move from a first position for allowing flow to pass through the valve body to a second position for blocking the flow from any direction at a predetermined pressure in the valve body;
   a pressure sensor having an integral pressure reference means mounted within the first chamber, and having means extending through the aperture adapted to engage said plunger for holding said plunger in the open position, said pressure sensor adapted to respond to increasing pressure within said first chamber and release said plunger at the predetermined pressure to the second position, thereby shutting off the flow through the valve;
   said housing having a third chamber communicating with the second chamber through an arcuate slot;
   disc means rotatably and linearly slidably mounted within the third chamber and including a part extending into the arcuate slot;
   whereby linear sliding of the disc means means engages its extending part with the plunger when in the second position and rotation of the disc means then resets the plunger to the first position where it is held by the pressure sensor extending means.

* * * * *